United States Patent
Yamada

(10) Patent No.: US 7,843,601 B2
(45) Date of Patent: Nov. 30, 2010

(54) METHOD FOR FORMING A COLOR IMAGE

(75) Inventor: Kazuro Yamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1142 days.

(21) Appl. No.: 10/887,780

(22) Filed: Jul. 9, 2004

(65) Prior Publication Data

US 2005/0024654 A1 Feb. 3, 2005

(30) Foreign Application Priority Data

Jul. 24, 2003 (JP) .............................. 2003-279408

(51) Int. Cl.
H04N 1/04 (2006.01)
H04N 1/56 (2006.01)
H04N 1/60 (2006.01)
G03F 3/00 (2006.01)
G03G 15/01 (2006.01)
G03G 15/23 (2006.01)

(52) U.S. Cl. ..................... 358/1.9; 358/474; 358/498; 358/500; 358/501; 358/504; 358/505; 358/514; 358/515; 358/516; 358/518; 399/38; 399/39; 399/45; 399/49; 399/388; 399/364; 399/309; 399/306; 355/23; 355/24; 355/26

(58) Field of Classification Search ................. 358/474, 358/498, 500, 501, 504, 505, 514, 515, 516, 358/518, 520, 1.9; 399/38, 39, 45, 49, 388, 399/364, 309, 306; 355/23, 24, 26

See application file for complete search history.

(56) References Cited

U.S. PATENT DOCUMENTS

| | | | | |
|---|---|---|---|---|
| 4,511,242 A | * | 4/1985 | Ashbee et al. | 399/395 |
| 4,905,053 A | * | 2/1990 | Matsuo et al. | 399/402 |
| 5,030,987 A | * | 7/1991 | Kato et al. | 355/24 |
| 5,067,024 A | * | 11/1991 | Anzai | 358/296 |
| 5,095,371 A | * | 3/1992 | Tanaka et al. | 358/300 |
| 5,124,727 A | * | 6/1992 | Yamazaki | 346/134 |
| 5,812,901 A | * | 9/1998 | Morikawa | 399/19 |
| 5,835,820 A | * | 11/1998 | Martin et al. | 399/85 |

(Continued)

FOREIGN PATENT DOCUMENTS

JP 2003-084532 3/2003

(Continued)

Primary Examiner—Edward L Coles
Assistant Examiner—Beniyam Menberu
(74) Attorney, Agent, or Firm—Canon U.S.A., Inc. I.P. Division

(57) ABSTRACT

A method for forming a color image that allows a color image forming device to detect print chromaticity by an actually used print medium and automatically perform an optimal color balance adjustment in consideration of the chromaticity of the print medium. At a first step of the method, it is determined whether a feeder is selected for a subsequent printing operation. If selected, the process proceeds to a second step. If not selected, it is determined that the printing operation is not performed for some time and the process is completed without color balance adjustment. At the second step, a print medium for printing a test pattern is fed from the feeder selected for a subsequent printing operation, which is determined at the first step. A color sensor detects the chromaticity of the test pattern transferred and fused on the print medium, and the color balance is then adjusted.

3 Claims, 7 Drawing Sheets

U.S. PATENT DOCUMENTS

| | | | | |
|---|---|---|---|---|
| 5,987,227 | A * | 11/1999 | Endo et al. | 358/1.13 |
| 6,226,419 | B1 * | 5/2001 | Lodwick et al. | 382/294 |
| 6,324,377 | B2 * | 11/2001 | Ando et al. | 399/395 |
| 6,450,606 | B1 * | 9/2002 | Kato et al. | 347/19 |
| 6,519,425 | B2 * | 2/2003 | Fischer | 399/49 |
| 6,738,157 | B1 * | 5/2004 | Hirose | 358/1.16 |
| 6,834,169 | B2 * | 12/2004 | Hren et al. | 399/82 |
| 6,853,815 | B2 | 2/2005 | Tezuka et al. | |
| 6,912,952 | B1 * | 7/2005 | Landa et al. | 101/230 |
| 6,941,083 | B1 * | 9/2005 | Muratani | 399/49 |
| 6,961,148 | B2 * | 11/2005 | Simpson et al. | 358/1.9 |
| 7,239,404 | B2 * | 7/2007 | Fukushima | 358/1.14 |
| 7,304,753 | B1 * | 12/2007 | Richter et al. | 358/1.15 |
| 7,471,411 | B2 * | 12/2008 | Takaki | 358/1.15 |
| 7,486,410 | B2 * | 2/2009 | Hisamura | 358/1.12 |
| 7,697,154 | B2 * | 4/2010 | Ohue | 358/1.15 |
| 7,751,072 | B2 * | 7/2010 | Anderson et al. | 358/1.13 |
| 2001/0053304 | A1 * | 12/2001 | Noda | 400/578 |
| 2002/0051666 | A1 * | 5/2002 | Asai et al. | 399/391 |
| 2003/0085941 | A1 * | 5/2003 | Tezuka et al. | 347/19 |
| 2003/0094108 | A1 * | 5/2003 | Shiki | 101/171 |
| 2003/0215252 | A1 * | 11/2003 | Yokobori et al. | 399/45 |
| 2005/0024406 | A1 * | 2/2005 | Otsuki | 347/14 |
| 2005/0117927 | A1 * | 6/2005 | Tanaka et al. | 399/49 |
| 2009/0135442 | A1 * | 5/2009 | Taylor et al. | 358/1.13 |

FOREIGN PATENT DOCUMENTS

| | | |
|---|---|---|
| JP | 2003-107835 | 4/2003 |

* cited by examiner

METHOD FOR FORMING A COLOR IMAGE

This application claims priority from Japanese Patent Application No. 2003-205052 filed Jul. 31, 2003, which is hereby incorporated by reference.

BACKGROUND OF THE INVENTION

1. Field of the Invention

The present invention relates to a method for forming a color image and, in particular, a method for forming a color image with proper optical density.

2. Description of the Related Art

Recently, the demand for high-quality output images of electrophotographic color image forming devices, such as color printers and copiers, has increased. In particular, density gradation and its stability are main factors of the human evaluation of image quality.

However, in such color image forming devices, optical density of the output image changes with variations of parts caused by the environment and aging effects. In particular, in electrophotographic color image forming devices, even a slight environmental variation may tend to cause a density variation and ruin the color balance. Therefore, a constant density-gradation characteristic should be maintained at all times. For this purpose, color image forming devices have a gradation correction function using several types of process conditions, such as an amount of exposure and development biases, and a look-up table (LUT) for each color toner depending on absolute humidity. The color image-forming device then selects optimal values for the process conditions and gradation corrections based on absolute humidity measured by a temperature and humidity sensor.

Additionally, color image forming devices have been disclosed in which a gray patch of black (K) and a process gray patch of a mix of cyan (C), magenta (M), and yellow (Y) are formed on a print medium as test patterns, and a sensor (herein after referred to "a color sensor") detects the colors of the patches on the print medium by comparing the colors to each other after fusing, and then outputs a mixture ratio of CMY that makes the process gray patch an achromatic color.

In these color image forming devices, the detection result is fed back to an amount of exposure and process conditions of an image forming section as well as to a color matching table and a color separation table and a calibration table. The color-matching table converts RGB signals output from an image processing section to a color space of the color forming device while the color separation table converts the RGB signals to CMYK signals, and the calibration table corrects a density gradation characteristic. Accordingly, the color image forming devices can appropriately control the chromaticity of the output images on the print media (refer to, for example, Japanese Patent Laid-Open No. 2003-084532 or Japanese Patent Laid-Open No. 2003-107835).

The output image of these color image forming devices may be detected by an external image reader, a color meter, or a photographic densitometer and the chromaticity may be controlled in the same manner as described above; however, use of a color sensor to detect the output image is superior in that all the control is performed in a printer. The color sensor employs three or more light sources, for example, light-emitting elements having different spectrums, such as red (R), green (G), and blue (B), or a light source which emits white (W) light and three or more filters having different transmittance spectra of, for example, red (R), green (G), and blue (B) disposed on a light-sensitive element. Thus, three or more types of output, such as R, G, and B outputs, can be obtained.

In these cases, chromaticity of a patch, which is a test pattern, depends on chromaticity of the print medium. Accordingly, although patches are formed on print media based on the same process conditions and gradation correction, two chromaticity values are different if the print media are different. In particular, since it readily transmits light from the background of the print medium, a low-density patch is significantly affected by the chromaticity of the print medium. A color image forming device generally has a plurality of paper feeders (print media feeders) to support different types of print media, and can feed the print media by loading the different types of print media to the corresponding feeders.

However, in these known color image forming devices, since a print medium, on which the test pattern is formed, is fed from a specific feeder, the chromaticity is adjusted for a different print medium from that used for subsequent image forming when other media feeders with different print media are employed. This prevents proper color correction. To overcome this problem and obtain proper color balance adjustment, users must set the chromaticity of the print media in the color image forming devices by themselves.

SUMMARY OF THE INVENTION

To address one or more aforementioned drawbacks of the related art, one aspect of the present invention provides a method for forming a color image that can detect the chromaticity of print media actually used and automatically adjusts color balance in consideration of the chromaticity of a print medium by feeding a print medium on which test patterns are printed from a feeder used for subsequent printing.

According to one aspect of the present invention, in a method for forming a color image in a color image forming device including a plurality of feeders of print media, an image producing unit, and a test pattern sensor, the method forms a test pattern on a print medium and adjusts color balance of the image producing unit based on chromaticity of the test pattern detected by the test pattern sensor. The method includes a step of determining whether any one of the feeders of print media is selected when an image is formed and a step of adjusting the color balance of the image producing unit by forming the test pattern on a print medium fed from a feeder determined by the determination step.

According to another aspect of the present invention, in a method for forming a color image in a color image forming device including a plurality of feeders of print media, an image producing unit, and a test pattern sensor, the method forms a test pattern on a print medium in advance and adjusts color balance of the image producing unit based on chromaticity of the test pattern detected by the test pattern sensor. The method includes a steps of determining whether any one of the feeders of print media is selected in advance when an image is formed and a steps of adjusting the color balance of the image producing unit when an image is formed on a second surface of a print medium by forming the test pattern on a print medium fed from one of the feeders selected for forming an image on a first surface of the print medium in advance.

According to another aspect of the present invention, in a method for forming a color image in a color image forming device including a plurality of feeders of print media, an image producing unit, a test pattern sensor, and a memory unit, the method forms a test pattern on a print medium and adjusts color balance of the image producing unit based on chromaticity of the test pattern detected by the test pattern sensor, and the method includes a steps of storing a feeder that most recently fed a print medium in the memory unit when an image is formed and a steps of adjusting the color balance of the image producing unit by forming the test pattern on a print medium fed from the feeder stored in the memory unit.

According to another aspect of the present invention, a color image forming device includes a plurality of feeders of print media; an image producing unit; determining means for determining whether any one of the feeders of print media is selected; test pattern-creating means for forming a test pattern on a print medium fed from a feeder determined by the determining means; detecting means for detecting chromaticity of the test pattern formed on the print medium by a test pattern sensor; and adjusting means for adjusting the color balance of the image producing unit based on the chromaticity detected by the detecting means.

According to another aspect of the present invention, in a program for forming an image by using a processor controlling a color image forming device, the color image forming device includes a plurality of feeders of print media, an image producing unit, and a test pattern sensor, the color image forming device forms a test pattern on a print medium and adjusts color balance of the image producing unit based on chromaticity of the test pattern detected by the test pattern sensor. The program causes the processor to execute a step of determining whether any one of the feeders of print media is selected when an image is formed and a step of adjusting the color balance of the image producing unit by forming the test pattern on a print medium fed from a feeder determined by the determination step.

According to another aspect of the present invention, in a program for forming an image by using a processor controlling a color image forming device, the color image forming device includes a plurality of feeders of print media, an image producing unit, and a test pattern sensor, the color image forming device forms a test pattern on a print medium in advance and adjusts color balance of the image producing unit based on chromaticity of the test pattern detected by the test pattern sensor. The program causes the processor to execute a step of determining whether any one of the feeders of print media is selected in advance when an image is formed and a step of adjusting the color balance of the image producing unit when an image is formed on a second surface of a print medium by forming the test pattern on a print medium fed from one of the feeders selected for forming an image on a first surface of the print medium in advance.

According to another aspect of the present invention, in a program for forming an image by using a processor controlling a color image forming device, the color image forming device includes a plurality of feeders of print media, an image producing unit, and a test pattern sensor, the color image forming device forms a test pattern on a print medium and adjusts color balance of the image producing unit based on chromaticity of the test pattern detected by the test pattern sensor. The program causes the processor to execute a step of storing a feeder that most recently fed a print medium in the memory unit and a step of adjusting the color balance of the image producing unit by forming the test pattern on a print medium fed from the feeder stored in the memory unit.

According to another aspect of the present invention, when an image is formed, the method for forming a color image includes a selection step for selecting one of feeders of print media in advance and a correction step for correcting conditions of transferring and fusing by forming a test pattern on a print medium fed from the feeder selected in the selection step. Consequently, by feeding a print medium on which the test pattern is to be printed from a feeder for subsequent printing, a chromaticity detection using actually used print media is possible and, therefore, an automatic color balance adjustment in consideration of the chromaticity of a print medium is provided.

In addition, even in the case where the color image forming devices have a duplex printing capability or a feeder for the subsequent printing is not selected, an automatic color balance adjustment in consideration of the chromaticity of a print medium is provided.

Further features and advantages of the present invention will become apparent from the following description of the embodiments with reference to the attached drawings.

BRIEF DESCRIPTION OF THE DRAWINGS

FIG. 6A is a display in a normal mode, and FIG. 6B is a display after "PAPER SELECT" in a normal mode is selected.

DETAILED DESCRIPTION OF THE INVENTION

Embodiments of the present invention will now be described with reference to the accompanying drawings.

First Embodiment

Figure 1:
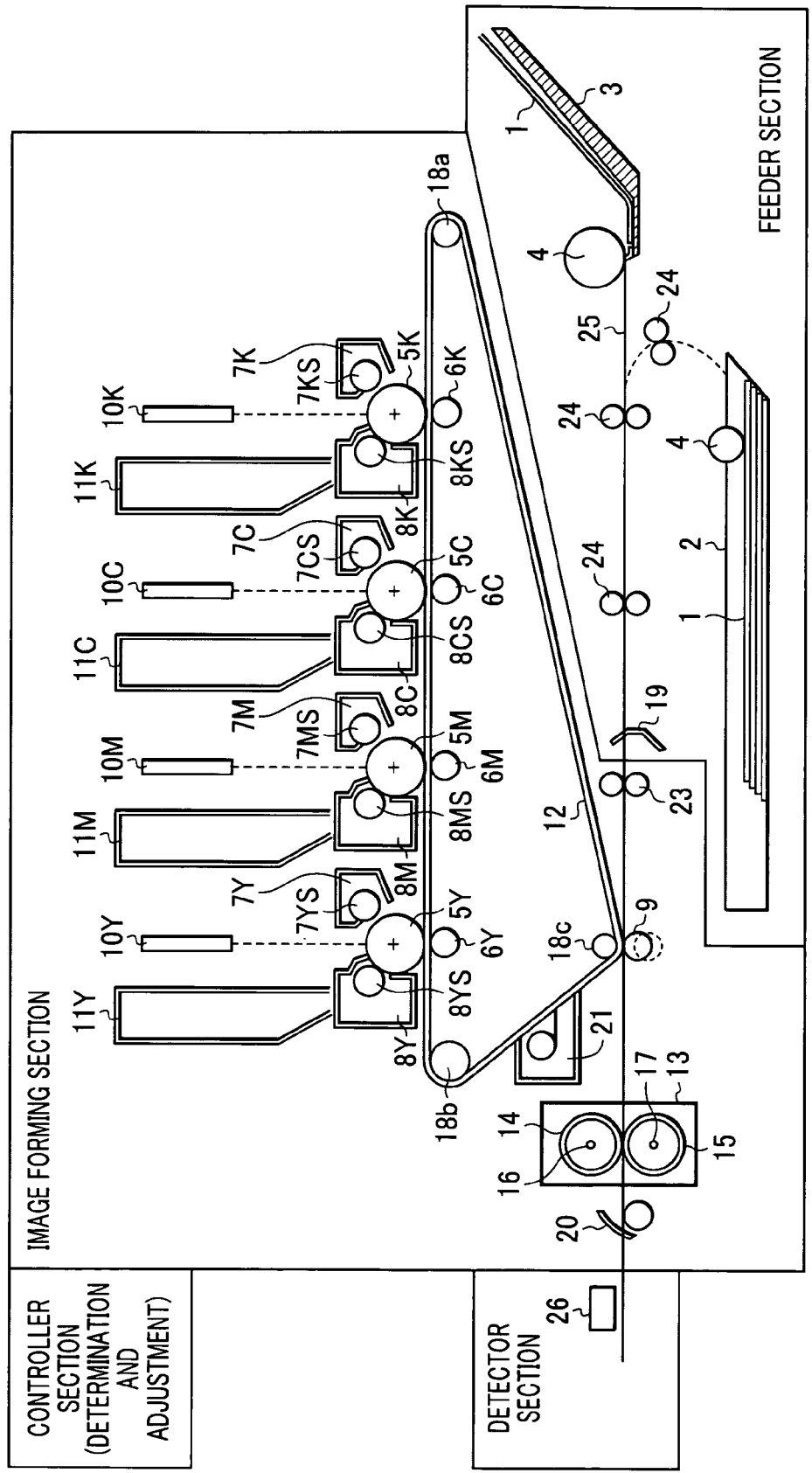
FIG. 1 is a diagram of a color image forming device according to a first embodiment of the present invention.

FIG. 1 is a diagram of a color image forming device according to a first embodiment of the present invention. In the first embodiment of the present invention, a media feeder is initially selected and a print medium on which a test pattern is to be printed is fed from the selected media feeder.

The color image forming device forms an electrostatic latent image for each color with exposure light based on image data in an image forming section, and then converts it to a visible image, transfers the color visible image to a print medium, and then fuses the image.

In the image forming section, stations for respective development colors are arranged. Each station includes a photoconductor drum 5, a charger 7, a developer 8, a laser scanner 10, and a toner cartridge 11. In this embodiment, the development colors are yellow (Y), magenta (M), cyan (C), and black (K). Since a station is provided for each color, four of each above-described component are provided. Therefore, the suffix letter "Y", "M", "C", or "K" is added to the reference numerals of the components to designate their supporting colors. For example, "5Y", "5M", "5C" and "5K" designates photoconductor drums for yellow, magenta, cyan, and black, respectively.

As well as the stations for respective colors, the image forming section includes an intermediate transfer belt 12, a secondary transfer roller 9, and a fuser 13.

A photoconductor drum 5 has an aluminum cylinder with an organic photo conductor coated on the outer surface of the cylinder. The photoconductor drum 5 is driven by a motor (not shown) to rotate in a counter-clockwise direction. The charger 7 includes a charge sleeve 7S for the primary charging of the photoconductor drum 5. The surface of the photoconductor drum 5 is selectively exposed by the laser scanner 10 based on input image data to sequentially create an electrostatic latent image. The developer 8 includes a developing sleeve 8S to visualize the electrostatic latent image. An intermediate transfer belt 12 is an endless belt, which is supported by a driving roller 18a and driven rollers 18b and 18c. The intermediate transfer belt 12 rotates in a clockwise direction while being in contact with the photoconductor drum 5. A toner image is sequentially transferred to the surface of the belt by a primary transfer roller 6.

A feed cassette 2 or feed tray 3, which is a feeder section of print medium, contains a print medium 1. The print medium 1 is conveyed on a paper path 25, which includes feed roller 4 and transport roller 24, and reaches a position where a registration sensor 19 is disposed. Then, the print medium 1 is moved a predetermined distance until the leading edge of the print medium 1 reaches a registration roller 23. Subsequently, the trailing edge is slightly advanced so that the print medium 1 is deflected. At this position, the print medium 1 stands by. The print medium 1 resumes moving into the nip between the intermediate transfer belt 12 and a secondary transfer roller 9, which are in contact with each other. At that time, visible images for respective colors, which are formed by multiple primary transfers, are secondarily transferred onto the print medium 1 simultaneously. During transfer, the secondary transfer roller 9 is brought into contact with the intermediate transfer belt 12, as indicated by a solid line; however, after transfer, it moves away from the intermediate transfer belt 12, as indicated by a dashed line.

A cleaner container 21 cleans the intermediate transfer belt 12 with an incorporated cleaning blade and stores any waste toner on the intermediate transfer belt 12, left over from the secondary transfer process. A fuser 13 fuses the toner on the print medium 1 while transporting the print medium 1. The fuser 13 includes a fuser roller 14, which heats the toner and a pressure roller 15 to urge the print medium 1 onto the fuser roller 14. The fuser roller 14 and the pressure roller 15 are hollow and have a heater 16 and a heater 17 in the interiors thereof, respectively.

After the toner is fused, a fuser output sensor 20 detects successful output of the print medium 1 from the fuser 13. Subsequently, the print medium 1 is output to an output tray by an output roller (both not shown). This is the end of a normal printing operation.

In the color image forming device shown in FIG. 1, a color sensor 26 for sensing a test pattern is disposed immediately after the fuser 13 towards an image-forming surface of the print medium 1 so as to detect optical density of a single-color patch or chromaticity of a mixed-color patch after fusing. To detect the chromaticity, the color sensor 26 employs three light-emitting elements (not shown) which emit red (R), green (G), and blue (B) light, respectively, or a light source which emits white (W) light and three filters having different transmittance spectra of red (R), green (G), and blue (B) disposed on a light-sensitive element.

An electronic control configuration of the color image forming device of the present invention will now be described with reference to FIG. 7.

Figure 7:
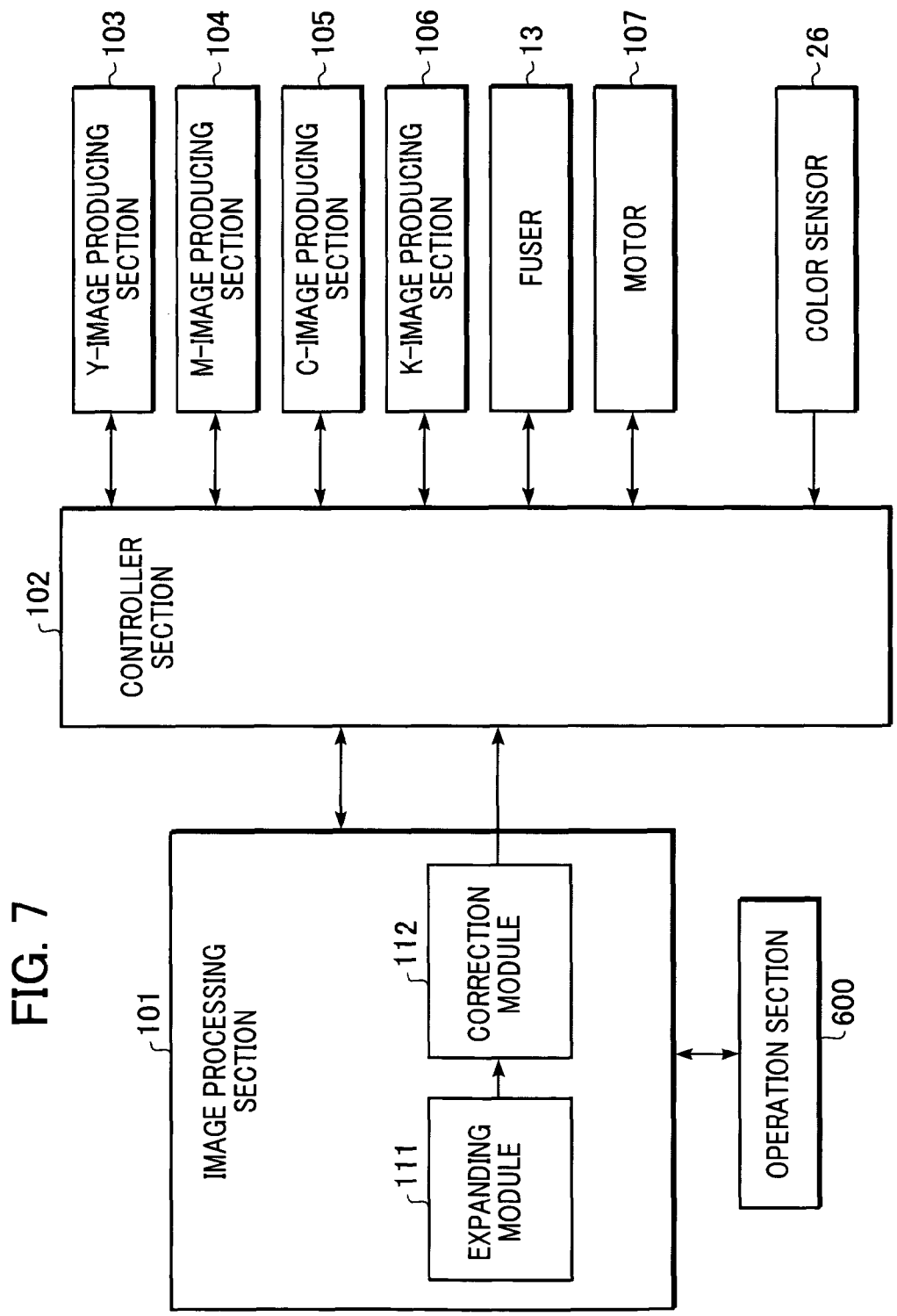
FIG. 7 shows an electric configuration of the color image forming device.

With reference to FIG. 7, an image processing section 101 creates image data. The image processing section 101 includes an expanding module 111 which receives a print job from a host computer (not shown) and expands it to image data for an image to be formed in the color image forming device, and a gamma correction module 112 which performs various types of image processing based on an incorporated look-up table for each color. In addition, the image processing section 101 is connected to an operation section 600, which functions as a user interface. The operation section 600, described in detail below, allows the color image forming device to display information for users and allows the users to input commands to the device.

Image producing sections 103, 104, 105, and 106 produce images of chromatic colors, yellow, magenta, cyan, and an achromatic color, black, respectively. A fuser 13 fuses the produced image onto a print medium. Each image producing section includes the above-described photoconductor drum 5, primary transfer roller 6, charger 7, charging sleeve 7S, developer 8, developing sleeve 8S, laser scanner 10, and toner cartridge 11. A motor 107 rotatably drives various types of devices, which form images and rollers, which transport the print medium. Reference numeral 26 denotes the above-described color sensor.

A controller section 102 controls the image producing sections 103 to 106, the fuser 13, and the motor 107 to produce an image. The controller section 102 adjusts color balance in accordance with a flow chart described below and also executes various types of image producing steps.

Additionally, by changing tables stored in the correction module 112 of the image processing section 101 based on a detection result of the color sensor 26, desired color balance can be obtained. These correction tables may be stored in a nonvolatile memory (not shown) in the controller section 102.

Figure 2:
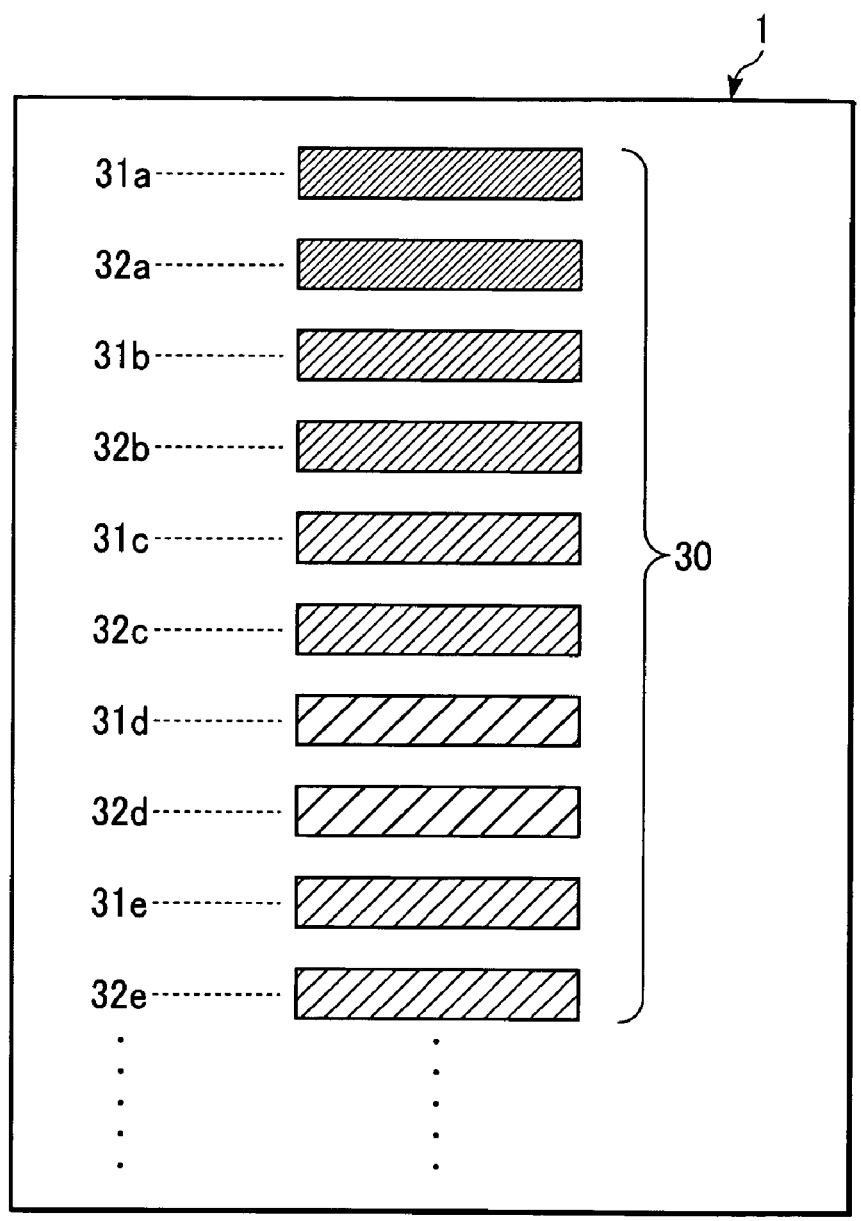
FIG. 2 shows an example of a test pattern on a print medium for detecting optical density or chromaticity.

FIG. 2 shows an example of a test pattern on the print medium 1 to detect optical density or chromaticity. A test pattern 30 includes patches of gray-scale, which is a center color of a color space and is used to correct the color balance. That is, the test pattern 30 includes gray-scale patches 31 of black (K) and process gray patches 32 of a mix of yellow (Y), magenta (M), and cyan (C), and pairs of a gray-scale patch 31 of black (K) and a process gray patch 32, which have the same color or the closest colors in a standard color image forming device, for example, a pair of patches 31a and 32a, a pair of patches 31b and 32b, and a pair of 31c and 32c are arranged in line. The color sensor 26 detects chromaticity of these patches.

Figure 6A:
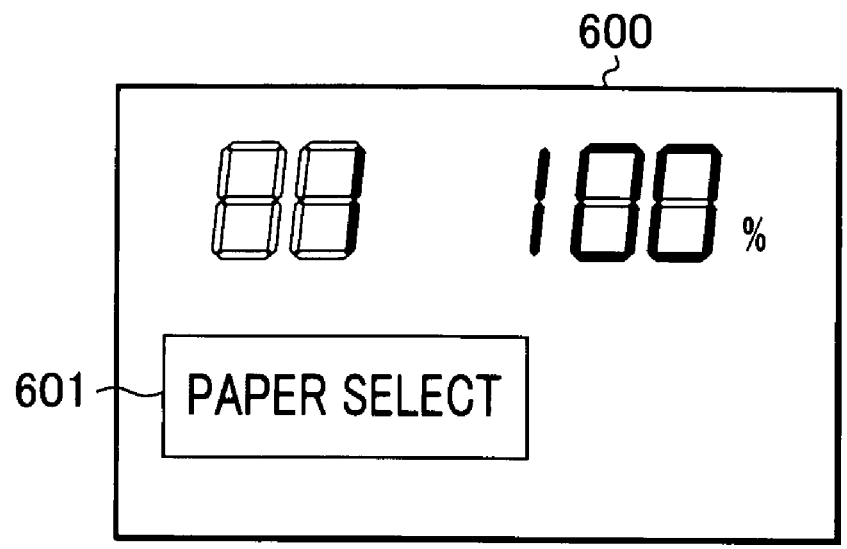
FIGS. 6A and 6B show an operation section of the color image forming device, where
Figure 6B:
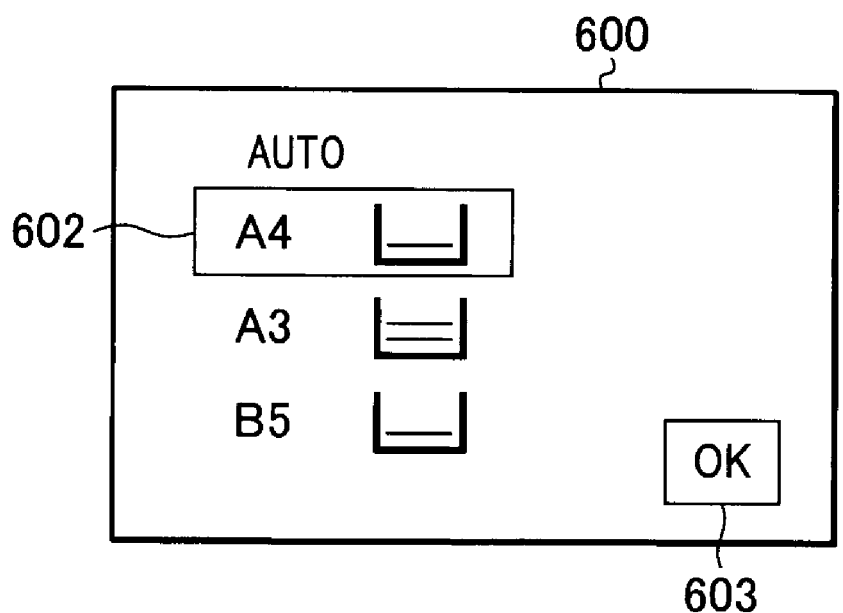

FIGS. 6A and 6B show the operation section of the color image forming device. The operation section 600 is composed of a touch panel above a display element, such as a liquid crystal display. Displayed information can be changed depending on an operation phase. FIG. 6A shows a touch panel displaying a "PAPER SELECT" button 601 for selecting a desired paper type. FIG. 6B shows the touch panel displaying a paper feeder menu for different paper sizes after the "PAPER SELECT" button 601 shown in FIG. 6A is touched.

The menu displayed in the operation section includes, for example, paper sizes "A4", "A3", "B5", which each feed tray supports, and "AUTO". Additionally, the remaining amount of paper for each feed tray can be displayed at the same time. If a paper of "A4" size is used, this is performed by touching "A4" in a display field 602, followed by touching an "OK" button 603. In this embodiment, the display section in which a touch panel is operated is described. Alternatively, a keyboard or another input method may be adopted. Also, a display element other than a liquid crystal display may be adopted. Additionally, all the information may be displayed in one screen or a plurality of screens may be selectively displayed by using tubs.

Figure 3:
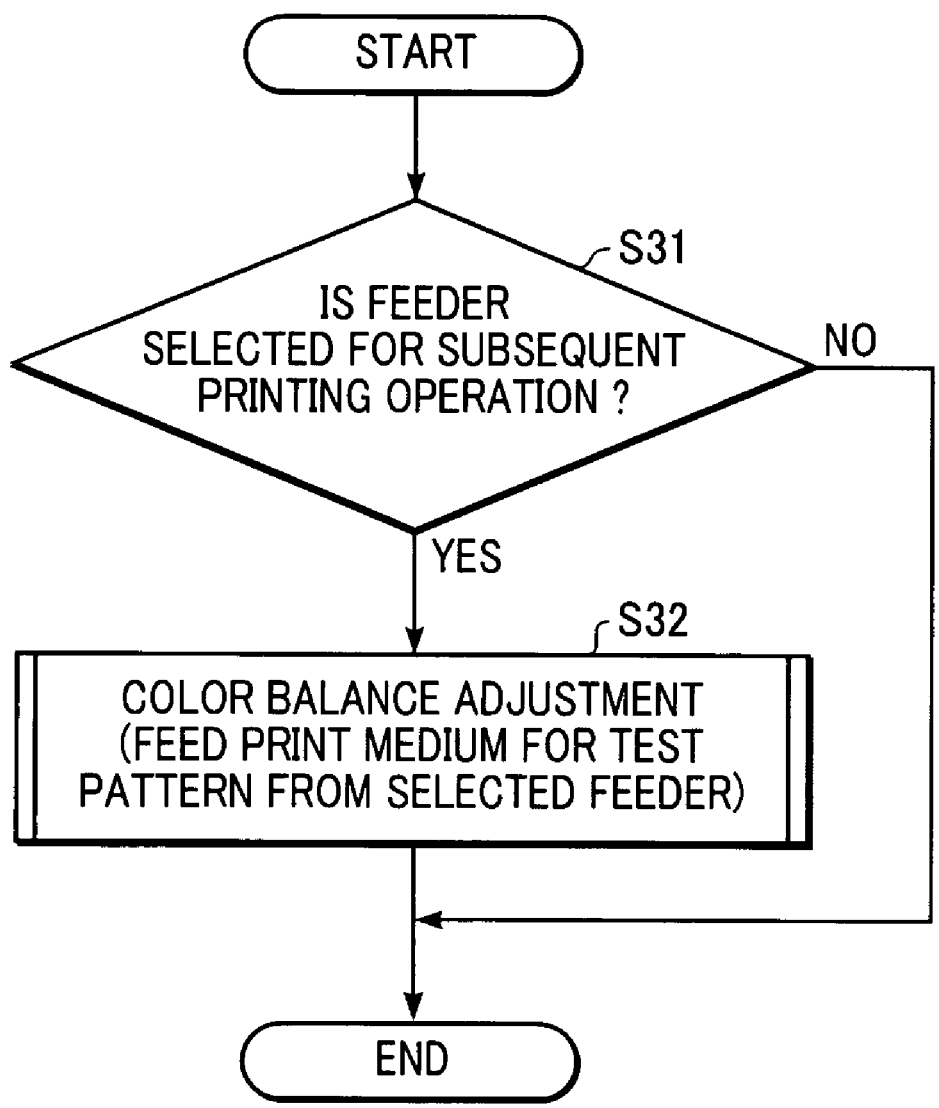
FIG. 3 is a flow chart for performing color balance adjustment according to the first embodiment of the present invention.

FIG. 3 is a flow chart for performing color balance adjustment in accordance with the first embodiment of the present invention. At step S31, the controller section determines whether a media feeder is selected for subsequent printing operation. If selected, the process proceeds to step S32, where color balance adjustment is performed. If media feeder is not selected, the process is completed without color balance adjustment.

At step S32, a print medium on which the test pattern is printed is fed from the selected media feeder. The test pattern is then printed and fused on the print medium and the color sensor 26 detects the chromaticity of the test pattern after which this chromaticity is used to perform color balance adjustment. A first advantage of the present embodiment is that since chromaticity is detected by using the type of print medium that will be used for subsequent printing operations, an optimal color balance adjustment can be provided in consideration of the chromaticity of the print medium itself.

Second Embodiment

The present invention includes various embodiments that are consistent with the spirit and scope of the invention. For example, in a second embodiment, the present invention is applied to a color image forming device capable of automatic duplex printing. In duplex printing, an image is printed on both sides of the print medium. Specifically, an image is transferred to a first-side of the print medium and is fused, and then is delivered to a switchback mechanism (not shown). By the switchback mechanism (duplex printing unit), a surface of the print medium is turned over and is subsequently fed to the duplex path. After an image is transferred to a second-side of the print medium and is fused, the print medium is output from the device. After an image is formed on the second side of the print medium, the image forming device allows the print medium to be fed from the duplex path by selecting "duplex" as one of the feeders. That is, for the color image forming device capable of automatic duplex printing, in order to adjust color balance for the second side after the first side is printed, the device feeds a print medium for test pattern printing, based on history information, from a feeder that has fed a print medium for first-side printing as further described with reference to FIG. 4.

Figure 4:
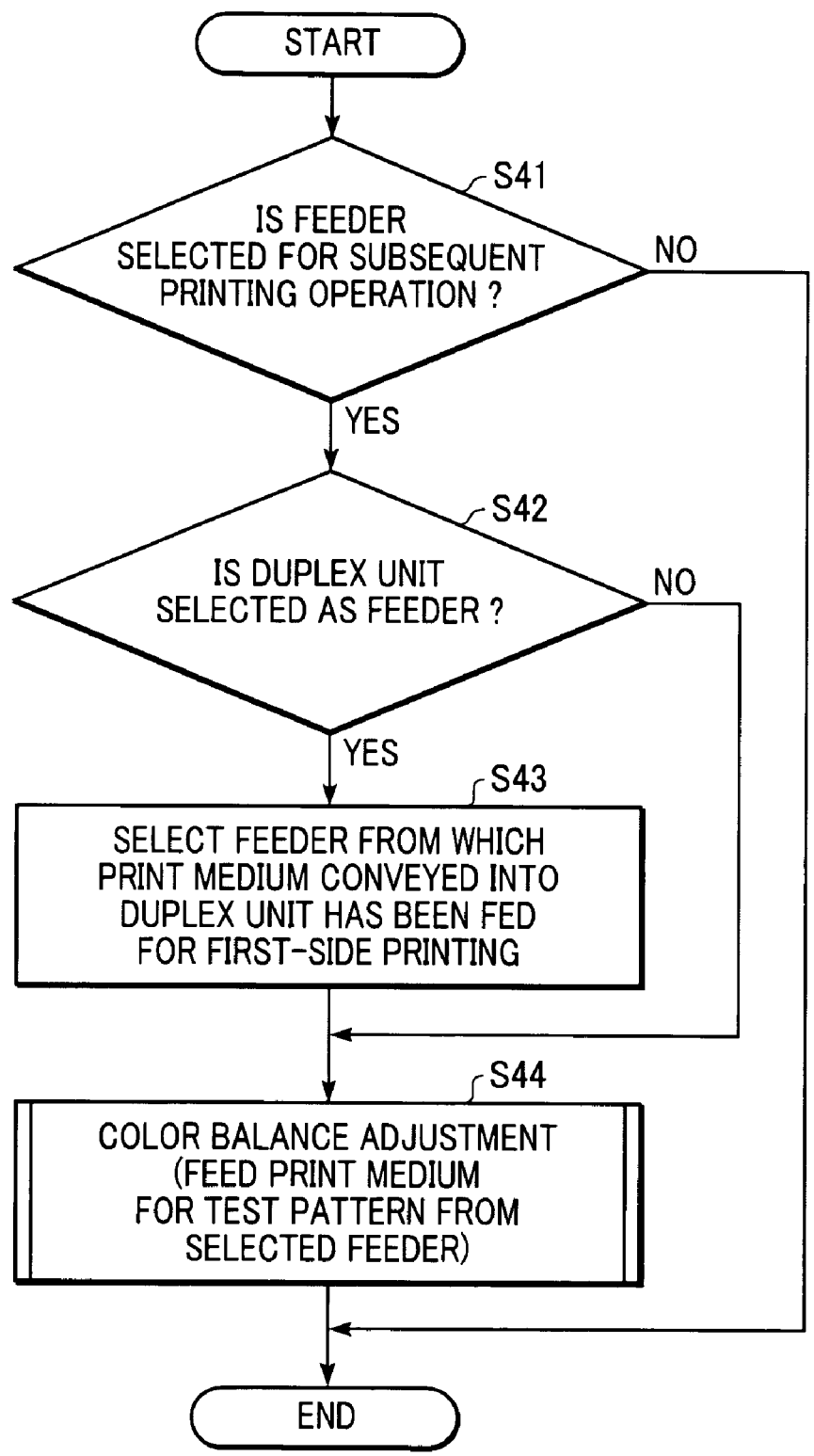
FIG. 4 is a flow chart for performing color balance adjustment according to a second embodiment of the present invention.

FIG. 4 is a flow chart for performing color adjustment in accordance with a second embodiment of the present invention. At step S41, it is determined whether a media feeder is selected for printing. If selected, the process proceeds to step S42. If not selected, the process is completed without color balance adjustment.

At step S42, it is determined whether the selected feeder is a duplex printing unit. If a duplex printing unit is selected, the process proceeds to step S43. Otherwise, a print medium for printing the test pattern is fed from the selected feeder, and the process proceeds to step S44 to adjust color balance.

At step S43, in accordance with a print operation history, a feeder previously used for first-side printing is selected for test pattern printing. At step S44, a print medium for test pattern printing is fed from the selected feeder for subsequent printing determined at step S41 or the feeder, determined at step S43. Then, the chromaticity of the test pattern transferred and fused on the print medium is detected by the color sensor 26 and a color balance adjustment is performed.

In the above-described structure, since the chromaticity is detected by using a print medium similar to those used for subsequent printing operations, an optimal color balance adjustment can be provided in consideration of the color of the print medium itself.

Third Embodiment

According to a third embodiment of the present invention, the last feeder used is stored in memory. If a feeder for printing is not selected, the stored last feeder is employed to feed the print medium.

Figure 5:
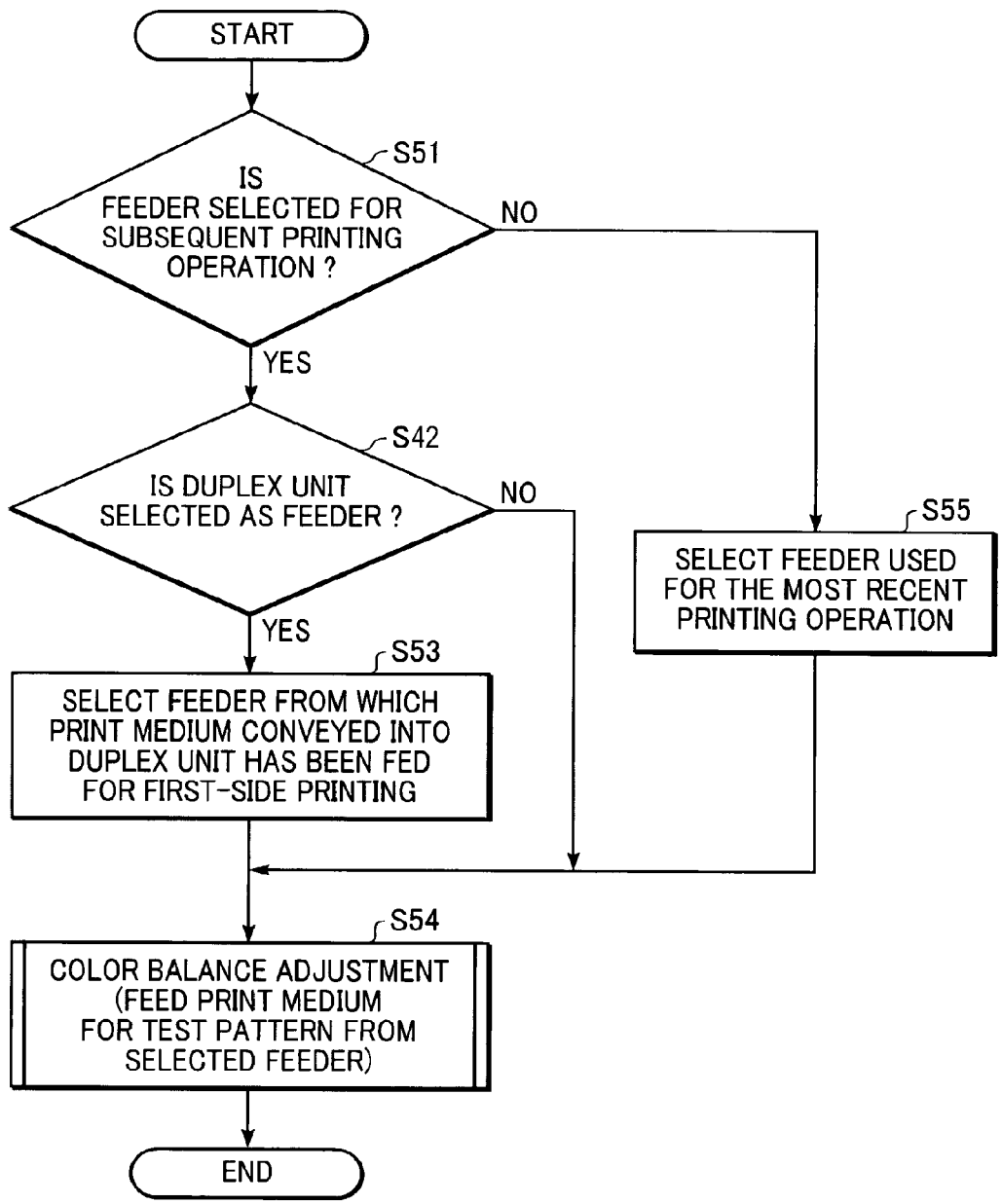
FIG. 5 is a flow chart for performing color balance adjustment according to a third embodiment of the present invention.

FIG. 5 is a flow chart for performing color adjustment in accordance with the third embodiment of the present invention. The descriptions of processes in FIG. 5 identical to those in FIG. 4 are omitted.

At step S51, it is determined whether a feeder is selected for subsequent printing operation. If it is not selected, the process proceeds to step S55. At step S55, the feeder that was last used for printing is selected for feeding the print medium.

At step S54, the print medium for test pattern printing is fed from the selected feeder for subsequent printing, which is determined at step S51, the feeder determined at step S53, from which the print medium conveyed in the duplex printing unit after first-side printing has been fed, or the feeder determined in step S55, from which a print medium has been most recently fed for printing. Then, the chromaticity of the test pattern transferred and fused on the print medium is detected by the color sensor 26 and a color balance adjustment is performed.

In the above-described structure, since the color is detected by using a print medium used for a subsequent printing operation, an optimal color balance adjustment can be provided in consideration of the chromaticity of the print medium itself.

Examples of the present invention will now be described as follows.

Example 1

In a method for forming a color image in a color image forming device including a plurality of feeders of print media, an image producing unit, and a test pattern sensor, the method forms a test pattern on a print medium and adjusts color balance of the image producing unit based on chromaticity of the test pattern detected by the test pattern sensor, and the method includes a step of determining whether any one of the feeders of print media is selected when an image formed and a step of adjusting the color balance of the image producing unit by forming the test pattern on the print medium.

Example 2

In a method for forming a color image in a color image forming device including a plurality of feeders of print media, an image producing unit, and a test pattern sensor, the method forms a test pattern on a print medium in advance and adjusts color balance of the image producing unit based on chromaticity of the test pattern detected by the test pattern sensor. The method includes a steps of determining whether any one of the feeders of print media is selected in advance when an image is formed and a steps of adjusting the color balance of the image producing unit when an image is formed on a second surface of a print medium by forming the test pattern on a print medium fed from one of the feeders selected for forming an image on a first surface of the print medium in advance.

Example 3

In a method for forming a color image in a color image forming device including a plurality of feeders of print media, an image producing unit, a test pattern sensor, and a memory unit, the method forms a test pattern on a print medium and adjusts color balance of the image producing unit based on chromaticity of the test pattern detected by the test pattern sensor. And, the method includes a steps of storing a feeder that most recently fed a print medium in the memory unit when an image is formed and a steps of adjusting the color balance of the image producing unit by forming the test pattern on a print medium fed from the feeder stored in the memory unit.

Example 4

A color image forming device includes a plurality of print media feeders; an image producing unit; determining means for determining whether any one of the feeders of print media is selected; test pattern-creating means for forming a test pattern on a print medium fed from a feeder determined by the determining means; detecting means for detecting chromaticity of the test pattern formed on the print medium by a test pattern sensor; and adjusting means for adjusting the color balance of the image producing unit based on the chromaticity detected by the detecting means.

Example 5

The color image forming device described in Example 4 further includes duplex image forming means for producing images on both first and second sides of a print medium, wherein, when the color image forming device forms an image on the second side of the print medium, the test pattern-creating means forms the test pattern on a print medium fed from a feeder determined by the determining means when an image is formed on the first side of the print medium.

Example 6

The color image forming device described in Example 4 further includes memory means for storing a feeder that most recently fed a print medium in a memory unit, wherein the test pattern-creating means forms the test pattern on a print medium fed from the feeder stored in the memory unit.

Example 7

The color image forming device described in Example 4, 5 or 6 further includes operating means for outputting set-up information for setting up the feeder of a print medium based on information input by a user, wherein the determining means determines whether any one of the feeders is selected and set up.

Example 8

The color image forming device described in Example 4, 5 or 6 further includes network connection means for connecting to an external network and receiving set-up information for setting up the feeder of a print medium, wherein the determining means determines whether any one of the feeders is selected and set up based on the set-up information received from the network connection means.

Example 9

In a program for forming an image by using a processor controlling a color image forming device, the color image forming device includes a plurality of feeders of print media, an image producing unit, and a test pattern sensor, the color image forming device forms a test pattern on a print medium and adjusts color balance of the image producing unit based on chromaticity of the test pattern detected by the test pattern sensor. The program causes the processor to execute a step of determining whether any one of the feeders of print media is selected when an image is formed and a step of adjusting the color balance of the image producing unit by forming the test pattern on a print medium fed from a feeder determined by the determination step.

Example 10

In a program for forming an image by using a processor controlling a color image forming device, the color image forming device includes a plurality of feeders of print media, an image producing unit, and a test pattern sensor, the color image forming device forms a test pattern on a print medium in advance and adjusts color balance of the image producing unit based on chromaticity of the test pattern detected by the test pattern sensor. The program causes the processor to execute a step of determining whether any one of the feeders of print media is selected in advance when an image is formed and a step of adjusting the color balance of the image producing unit when an image is formed on a second surface of a print medium by forming the test pattern on a print medium fed from one of the feeders selected for forming an image on a first surface of the print medium in advance.

Example 11

In a program for forming an image by using a processor controlling a color image forming device, the color image forming device includes a plurality of feeders of print media, an image producing unit, and a test pattern sensor, the color image forming device forms a test pattern on a print medium and adjusts color balance of the image producing unit based on chromaticity of the test pattern detected by the test pattern sensor. The program causes the processor to execute a step of storing a feeder that most recently fed a print medium in the memory unit and a step of adjusting the color balance of the image producing unit by forming the test pattern on a print medium fed from the feeder stored in the memory unit.

Example 12

A computer readable recording medium stores the program described in Example 9, 10, or 11.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for forming a color image in a color image forming device comprising a plurality of feeders of print media, an image producing unit, and a test pattern sensor, the method forming a test pattern on a print medium and adjusting color balance of the image producing unit based on chromaticity of the test pattern detected by the test pattern sensor, the method comprising:

selecting a feeder of print media for subsequent printing, the feeder including a duplex printing unit;

determining whether any one of the feeders of print media is selected before first feeding operation and in advance in the selecting and whether the feeder of print media selected before first feeding operation and in advance is the duplex printing unit;

adjusting the color balance of the image producing unit by forming the test pattern on a print medium fed from the selected feeder if it is determined that any one of the feeders of print media, which is not the duplex printing unit, is selected before first feeding operation and in advance in the selecting, wherein, when the image of the test pattern is formed, if it is determined that any one of the feeders of print media is not selected, a test pattern is formed on a print media fed from the feeder of print media stored when a most recent image is formed, and the color balance of the image producing unit is adjusted, and if it is determined that the duplex printing unit is selected as any one of the feeders of print media before first feeding operation and in advance in the selecting, a test pattern is formed on a print medium fed not from the duplex printing unit but from another feeder from which a print media is conveyed into the duplex printing unit for first-side printing, and the color balance of the image producing unit is adjusted; and storing, in a memory unit, as a history, a feeder that feeds the print media, when the image of the test pattern is formed.

2. A color image forming device, comprising:

a plurality of feeders of print media;

an image producing unit;

selecting means for selecting a feeder of print media for subsequent printing, the feeder including a duplex printing unit;

determining means for determining whether any one of the feeders of print media is selected by the selecting means before first feeding operation and in advance and whether the feeder of print media selected before first feeding operation and in advance is the duplex printing unit;

test pattern-creating means for forming a test pattern on a print medium fed from the selected feeder determined by the determining means;

detecting means for detecting chromaticity of the test pattern formed on the print medium by a test pattern sensor;

adjusting means for adjusting the color balance of the image producing unit based on the chromaticity detected by the detecting means if it is determined that any one of the feeders of print media, which is not the duplex printing unit, is selected before first feeding operation and in advance by the selecting means, wherein, when the image of the test pattern is formed, if the determining means determines that any one of the feeders of print media is not selected, a test pattern is formed by the test pattern-creating means on a print media fed from the feeder of print media stored when a most recent image is formed, and the color balance of the image producing unit is adjusted, and if it is determined that the duplex printing unit is selected as any one of the feeds of print media before first feeding operation and in advance by the selecting means, a test pattern is formed by the test pattern-creating means on a print medium fed not from the duplex printing unit but from another feeder from which a print media is conveyed into the duplex printing unit for first-side printing, and the color balance of the image producing unit is adjusted; and storing means for storing, as a history, a feeder that feeds the print media, when the image of the test pattern is formed.

3. The color image forming device according to claim 2, further comprising network connection means for connecting to an external network and receiving set-up information for setting up the feeder of a print medium, wherein the determining means determines whether any one of the feeders is selected and set up based on the set-up information received from the network connection means.

* * * * *